US009824302B2

(12) United States Patent
Grbic et al.

(10) Patent No.: US 9,824,302 B2
(45) Date of Patent: Nov. 21, 2017

(54) METHOD AND SYSTEM FOR MODEL-BASED FUSION OF MULTI-MODAL VOLUMETRIC IMAGES

(75) Inventors: Sasa Grbic, Erlangen (DE); Razvan Ioan Ionasec, Lawrenceville, NJ (US); Yang Wang, Princeton, NJ (US); Bogdan Georgescu, Plainsboro, NJ (US); Tommaso Mansi, Westfield, NJ (US); Dorin Comaniciu, Princeton Junction, NJ (US); Yefeng Zheng, Dayton, NJ (US); Shaohua Kevin Zhou, Plainsboro, NJ (US); Matthias John, Nürnberg (DE); Jan Boese, Eckental (DE)

(73) Assignee: Siemens Healthcare GmbH, Erlangen (DE)

( * ) Notice: Subject to any disclaimer, the term of this patent is extended or adjusted under 35 U.S.C. 154(b) by 905 days.

(21) Appl. No.: 13/412,869

(22) Filed: Mar. 6, 2012

(65) Prior Publication Data

US 2012/0230568 A1    Sep. 13, 2012

Related U.S. Application Data

(60) Provisional application No. 61/451,006, filed on Mar. 9, 2011.

(51) Int. Cl.
*G06K 9/00* (2006.01)
*G06K 9/62* (2006.01)

(52) U.S. Cl.
CPC ......... *G06K 9/6289* (2013.01); *G06K 9/6211* (2013.01)

(58) Field of Classification Search
None
See application file for complete search history.

(56) References Cited

U.S. PATENT DOCUMENTS

| 7,010,080 | B2 | 3/2006 | Mitschke |
| 7,117,026 | B2 | 10/2006 | Shao et al. |
| 2005/0031176 | A1* | 2/2005 | Hertel et al. .................. 382/128 |
| 2006/0020204 | A1 | 1/2006 | Serra et al. |
| 2007/0098299 | A1* | 5/2007 | Matsumoto .................. 382/284 |
| 2007/0269086 | A1* | 11/2007 | Kerwin et al. ................ 382/128 |
| 2008/0215298 | A1* | 9/2008 | Haney et al. ................. 702/189 |

(Continued)

FOREIGN PATENT DOCUMENTS

CN    101178814 A    5/2008

OTHER PUBLICATIONS

Chinese Office Action dated Jun. 22, 2015 corresponding to Chinese Application No. 201210120120.6 (56 pages).

(Continued)

*Primary Examiner* — Weiwen Yang (57) ABSTRACT

A method and system for fusion of multi-modal volumetric images is disclosed. A first image acquired using a first imaging modality is received. A second image acquired using a second imaging modality is received. A model and of a target anatomical structure and a transformation are jointly estimated from the first and second images. The model represents a model of the target anatomical structure in the first image and the transformation projects a model of the target anatomical structure in the second image to the model in the first image. The first and second images can be fused based on estimated transformation.

32 Claims, 6 Drawing Sheets

(56) References Cited

U.S. PATENT DOCUMENTS

| | | | |
|---|---|---|---|
| 2008/0287777 A1* | 11/2008 | Li et al. | 600/424 |
| 2010/0067768 A1 | 3/2010 | Ionasec et al. | |
| 2010/0160764 A1* | 6/2010 | Steinberg et al. | 600/407 |
| 2010/0172567 A1* | 7/2010 | Prokoski | 382/132 |
| 2010/0189320 A1* | 7/2010 | Dewaele | 382/128 |
| 2011/0060576 A1* | 3/2011 | Sharma et al. | 703/11 |
| 2011/0135173 A1 | 6/2011 | Elbaroudi et al. | |
| 2011/0178389 A1* | 7/2011 | Kumar | A61B 5/055 600/411 |
| 2012/0316421 A1* | 12/2012 | Kumar et al. | 600/407 |

OTHER PUBLICATIONS

Chinese Office Action dated Feb. 1, 2016 corresponding to Chinese Application No. 201210120120.6.

* cited by examiner

METHOD AND SYSTEM FOR MODEL-BASED FUSION OF MULTI-MODAL VOLUMETRIC IMAGES

This application claims the benefit of U.S. Provisional Application No. 61/451,006, filed Mar. 9, 2011, the disclosure of which is herein incorporated by reference.

BACKGROUND OF THE INVENTION

The present invention relates to fusion of multi-modal volumetric medical images, and more particularly, to model-based fusion of pre-operative and intra-operative volumetric medical images.

In recent years, there has been a major trend in cardiac therapy towards minimally invasive transcatheter procedures to reduce the risks involved with classical surgical techniques. Instead of a full sternotomy, instruments and devices are introduced through small incisions, advanced through vessels, and positioned to perform various procedures. Without direct access and view to the affected structures, such interventions are typically performed in so-called Hybrid ORs, operating rooms outfitted with advanced imaging equipment. Using such advanced imaging equipment, procedures such as Transcatheter Aortic Valve Replacement (TAV) are guided via real-time intra-operative images provided by C-arm X-ray and Transesophageal Echocardiography systems.

Traditionally, the field of medical image analysis has focused on construction of patient-specific anatomical models from well-established diagnostic imaging modalities (e.g., computed tomography (CT) and magnetic resonance (MR)) to aid disease analysis and treatment planning. For example, in the context of valvular disease management, techniques have been proposed for modeling the aortic valve and the mitral valve in CT and/or MR images. However, such techniques have not been developed to cope with the reduced quality and contrast characteristics of intra-operative images. Accordingly, the usage of such techniques is limited to pre-operative decision making.

BRIEF SUMMARY OF THE INVENTION

The present invention provides a method and system for fusion of pre-operative and intra-operative image information by jointly estimating anatomical models from multiple imaging modalities. The fusion of the pre-operative and intra-operative image information allows high-quality patient-specific models to be integrated into the imaging environment of operating rooms to guide cardiac interventions. Embodiments of the present invention achieve robustness and efficiency by relying on machine learning techniques to drive the joint estimation process whereby similarities between multiple imaging modalities are exploited. Embodiments of the present invention utilize statistical models of anatomy within a probabilistic estimation framework to ensure physiological compliant results.

In one embodiment of the present invention, a first image acquired using a first imaging modality is received, and a second image acquired using a second imaging modality is received. A model and of a target anatomical structure and a transformation are jointly estimated from the first and second images. The model represents a model of the target anatomical structure in the first image and the transformation projects a model of the target anatomical structure in the second image to the model in the first image. The first and second images can be fused based on estimated transformation.

These and other advantages of the invention will be apparent to those of ordinary skill in the art by reference to the following detailed description and the accompanying drawings.

DETAILED DESCRIPTION

The present invention relates to model-based fusion of multi-modal volumetric images. Embodiments of the present invention can be used to fuse image information in multiple imaging modalities, such as computed tomography (CT), Dyna CT, echocardiography data, fluoroscopic image data, and magnetic resonance imaging (MRI). Embodiments of the present invention are described herein to give a visual understanding of the model-based image fusion method. A digital image is often composed of digital representations of one or more objects (or shapes). The digital representation of an object is often described herein in terms of identifying and manipulating the objects. Such manipulations are virtual manipulations accomplished in the memory or other circuitry / hardware of a computer system. Accordingly, is to be understood that embodiments of the present invention may be performed within a computer system using data stored within the computer system.

Embodiments of the present invention provide a method for model-based fusion of multi-modal volumetric images. Benefits of the method include: completeness, by exploiting the complementary information by multiple modalities; robustness, by exploiting the redundant information from multiple modalities to reduce estimation uncertainty; and fusion, by obtaining a model-sensitive integration of the multiple modalities. Embodiments of the present invention can be applied to model-based fusion of pre-operative and intra-operative images for transcatheter valve procedures, but the present invention is not limited thereto.

Figure 1:
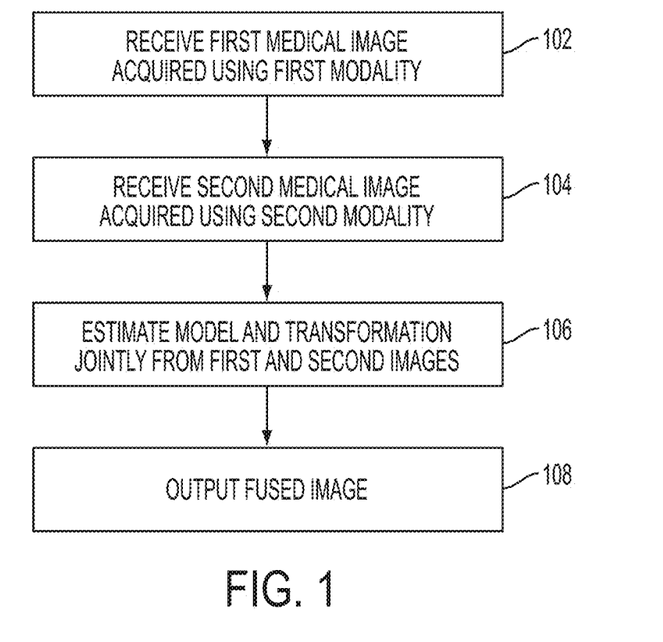
FIG. 1 illustrates a method for model-based fusion of multi-modal images according to an embodiment of the present invention.

FIG. 1 illustrates a method for model-based fusion of multi-modal images according to an embodiment of the present invention. The method of FIG. 1 is described herein as fusing pre-operative and intra-operative image information, but the present invention is not limited thereto. At step 102, a first medical image is received. The first medical image is acquired using a first imaging modality. The first medical image may be received directly from an image acquisition device, such as a CT scanner. It is also possible that the first medical image is received by loading a stored medical image from a storage or memory of a computer system. In an advantageous embodiment, the first medical image may be a pre-operative volumetric (3D) image of a patient. For example, the first medical image may be a pr-operative CT or MR image.

At step 104, a second medical image is received. The second medical image is acquired using a second imaging modality. The second medical image may be received directly from an image acquisition device, such as a C-arm image acquisition device. It is also possible that the second medical image is received by loading a stored medical image from a storage or memory of a computer system. In an advantageous embodiment, the second medical image may be an intra-operative volumetric (3D) image of a patient. For example, the second medical image may be an intra-operative C-arm CT image or transesophageal echocardiogram (TEE) image received from an image acquisition device during an operation, such as a transcatheter aortic valve replacement.

At step 106, an anatomic model of a target anatomic structure is estimated jointly in the first and second images. The jointly estimated anatomic models in the first and second images can be expressed as a model and a transformation. The model corresponds to the estimated anatomic model of the target anatomic structure in the first image and the transformation projects the estimated anatomic model in the second image to the estimated anatomic model in the first image. In the case of fusing a pre-operative 3D image with an intra operative 3D image, this step jointly estimates pre-operative and intra-operative models of the target structure in order to provide model sensitive integration of the pre-operative and intra-operative image information.

Figure 2:
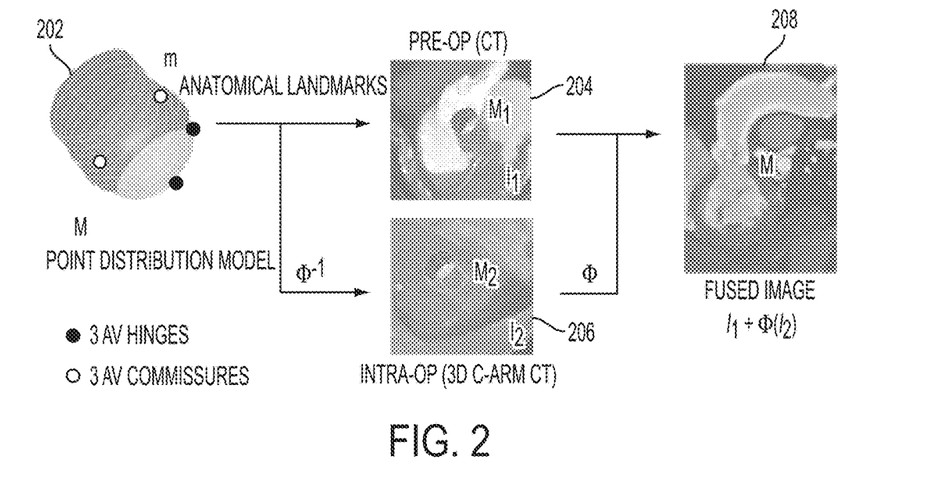
FIG. 2 illustrates an overview of the model-based fusion of multi-modal images.

FIG. 2 illustrates an overview of the model-based fusion of multi-modal images. The example of FIG. 2 jointly estimates an aortic valve model in pre-operative and intra-operative image data. As shown in FIG. 2, starting with a statistical aortic valve model 202, the goal is to estimate a 3D anatomical patient-specific model M from volumetric datasets $I_1$ and $I_2$, where $I_1$ is the pre-operative image 204 and $I_2$ is the intra-operative image 206, and the transformation $\phi$, which maps the intra-operative model $M_2$ to the pre-operative model $M_1$. In FIG. 2, the jointly estimated patient-specific model M is shown in the fused image 208. The optimal jointly estimated patient-specific model and transformation can be expressed as:

$$(\hat{\phi}, \hat{M}) = \underset{M,\phi}{\operatorname{argmax}} \log P(M, \phi | I_1, I_2) \quad (1)$$

where $\phi$ is composed of an affine transformation A and a non-linear warping transformation D, $\phi = DA$. D Models the small deformation of M due to respiration and uncertainties in acquisition phase between the pre-operative and intra-operative data. The model M is represented as a point distribution model. Using the transformation $\phi$, the pre-operative and intra-operative models $M_1$ and $M_2$ expressed as:

$$M = M_1 \quad M = DA\, M_2 \quad M_2 = A^{-1}D^{-1}M. \quad (2)$$

In general, equation (1) results in a system of equations for which there is no analytical solution. As shown in equation (3) below, the problem can be approximated by expanding the formulation and exploiting independencies. In addition, a shape constraint term is added to restrict the estimated model M to a shape space learned from a database of annotated training samples. Accordingly, the problem can be expressed as:

$$(\hat{\phi}, \hat{M}) = \underset{M,\phi}{\operatorname{argmax}} \log(P(M | I_1) \cdot P(M | \phi(I_2)) \cdot P(M | I_1, \phi(I_2)) \cdot P(M, \phi | \mu, \Sigma)) \quad (3)$$

All of the probabilities in the formulation of equation (3) are modeled using robust learning based algorithms. The first term $P(M|I_1)$ and the second term $P(M|\phi(I_2))$ define the independent model estimations in the respective multi-modal images $I_1$ and $I_2$. Each of these posterior probabilities is estimated using a respective trained classifier. In advantageous implementation, each classifier can be trained based on annotated training data using a probabilistic boosting tree (PBT) and haar features to estimate the posterior probability. The model parameters for M are also selected based on a joint probability term $P(M|I_1, \phi(I_2))$ which exploits similarities between the models in the multi-modal images. The transformation $\phi$ is modeled as a warping transform with Gaussian radial basis functions. The number of control points for the Gaussian radial basis functions is much small than the number of shape points of M. The last term $P(M, \phi|\mu, \Sigma)$ represents a regularization of the shape M and the transformation $\phi$ based on a learned statistical shape model defined as a Gaussian distribution with mean $\mu$ and covariance matrix $\Sigma$ learned from annotated training data. Both the affine transformation A and the non-linear transformation D are updated based on this regularization term. A bias is applied toward the pre-operative model $M=M_1$, as the model estimation is more robust in the preoperative images. In certain embodiment, $I_1$ represents a CT image and $I_2$ represents a TEE and/or C-arm CT image.

In an advantageous embodiment, the modal-based fusion method is applied to estimation of an aortic valve model. As shown in FIG. 2, a statistical aortic valve model 202 is used to jointly estimate a patient-specific aortic valve model based on pre-operative and intra-operative image data. The aortic valve is modeled hierarchically using two layers. On the coarse level, the aortic valve is represented as a landmark model m with 6 landmark points (3 commissures and 3 hinges). The landmark points define the most important morphological and functional properties of the valve. The finer layer is defined as a point distribution model M with 1440 points spread along 36×20 parametric directions.

The joint term $P(M|I_1, \phi(I_2))$ should exploit the similarities between the models in the multi-modal images. Although it may be possible to use similarity functions, such mutual information or cross correlation, an advantageous embodiment of the present invention utilizes a similarity measure learned for the specific problem based on annotated training data. A boosting framework is employed in order to train a cascade of strong classifiers. Each strong classifier $F_{strong}$ consists of k weak classifiers $F_{weak}$ which learn the similarity between pairs of image patches $I_{S1} \in I_1$ and $I_{S2} \in I_2$, $F_{weak}(I_{S1}, I_{S2})$. The weak learners are constructed based on haar-like features extracted locally from rectangular patches $I_{S1}$ and $I_{S2}$ around the mesh points of $M_1$ and $M_2$. The patch size is fixed for both modalities.

The weak learner is modeled as a 2D piecewise constant function defined on a 2D feature space by the feature responses of $h(I_{S1})$ and $h(I_{S2})$. The 2D feature space is separated in equal rectangular non-overlapping regions. Therefore, the feature responses from both modalities can be quantized in 64×64 bins whereby the values are scaled between the minimum and maximum feature responses $h(I_{S1})$ and $h(I_{S2})$. Accordingly, $$F_{weak}(I_{S_1}, I_{S_2}) = \sum_{b=1}^{B} \sum_{c=1}^{C} \beta_{b,c} R_{b,c}[h(I_{S_1}) \times h(I_{S_2})] \quad (4)$$

where B and C are the bin numbers for the feature responses in the individual modalities and $\beta_{b,c}$ represents a constant associated with the region $\beta_{b,c}$. In an advantageous implementation, the optimal weights $\beta_{b,c}$ can be determined by fitting a least squares regression function. During detection, a probability for each weak classifier is evaluated by extracting the haar features from pairs of image patches. The features are assigned to a bin $\beta_{b,c}$ based on the feature response and multiplied by the corresponding weight $\beta_{b,c}$. A cascade of strong classifiers $F_{strong}$ is trained and the posterior probability of the similarity function is determined by:

$$P(M \mid I_1, \phi(I_2)) = S(I_{S1}, I_{S2}) \quad (5)$$
$$= \prod_{n=1}^{I} \frac{\exp(2F_{n,strong}(I_{S1}, I_{S2}))}{\exp(2F_{n,strong}(I_{S1}, I_{S2})) + 1}.$$

Figure 3:
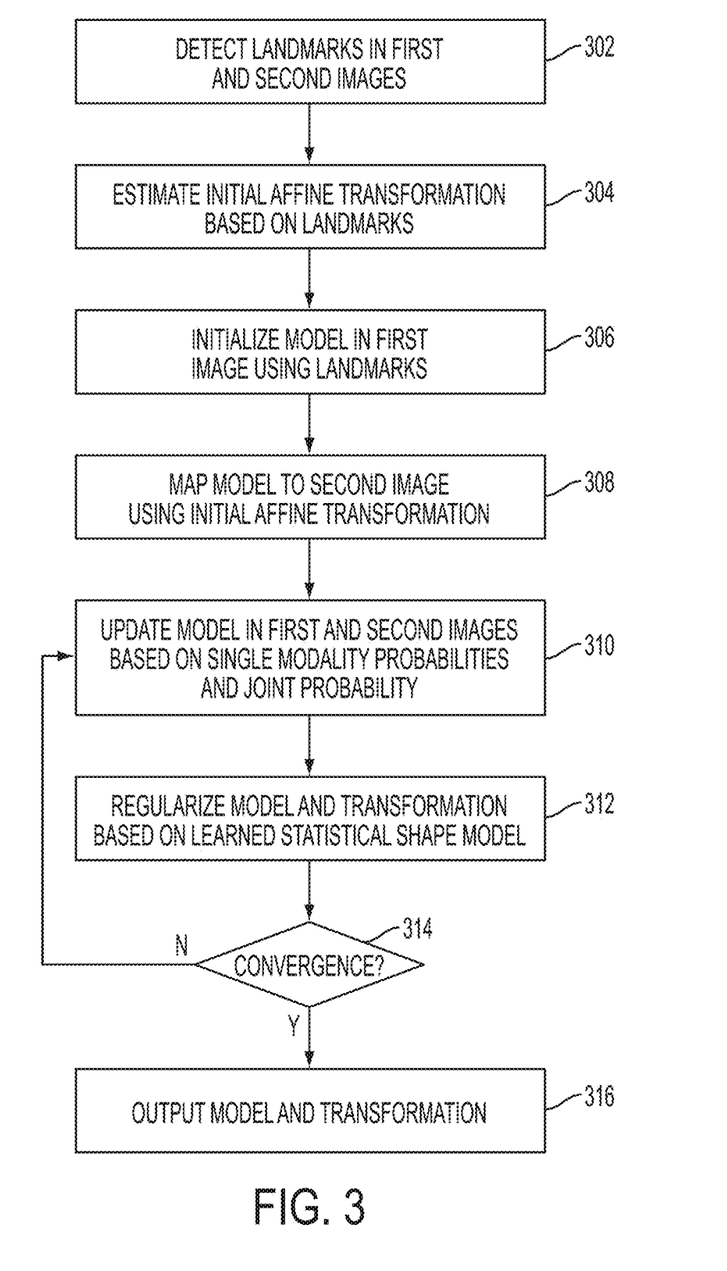
FIG. 3 illustrates a method for jointly estimating a model and transformation in first and second multi-modal images according to an embodiment of the present invention.

FIG. 3 illustrates a method for jointly estimating a model and transformation in first and second multi-modal images according to an embodiment of the present invention. The method of FIG. 3 provides a more detailed method that can be used to implement step 106 of FIG. 1. Referring to FIG. 3, at step 302, landmarks are independently detected in the first and second images. In particular, anatomic landmarks that can be used to fit the point distribution model of the target anatomic structure are detected in each of the first and second images. For example, in the embodiment in which the aortic valve model is jointly estimated in the first and second images, 3 commissure points and 3 hinge points are detected in each image. The landmarks are detected using landmark detectors trained using annotated training data. In a possible implementation, the landmark detectors are trained using a probabilistic boosting tree (PBT) and haar-like features from the annotated training data.

Figure 4:
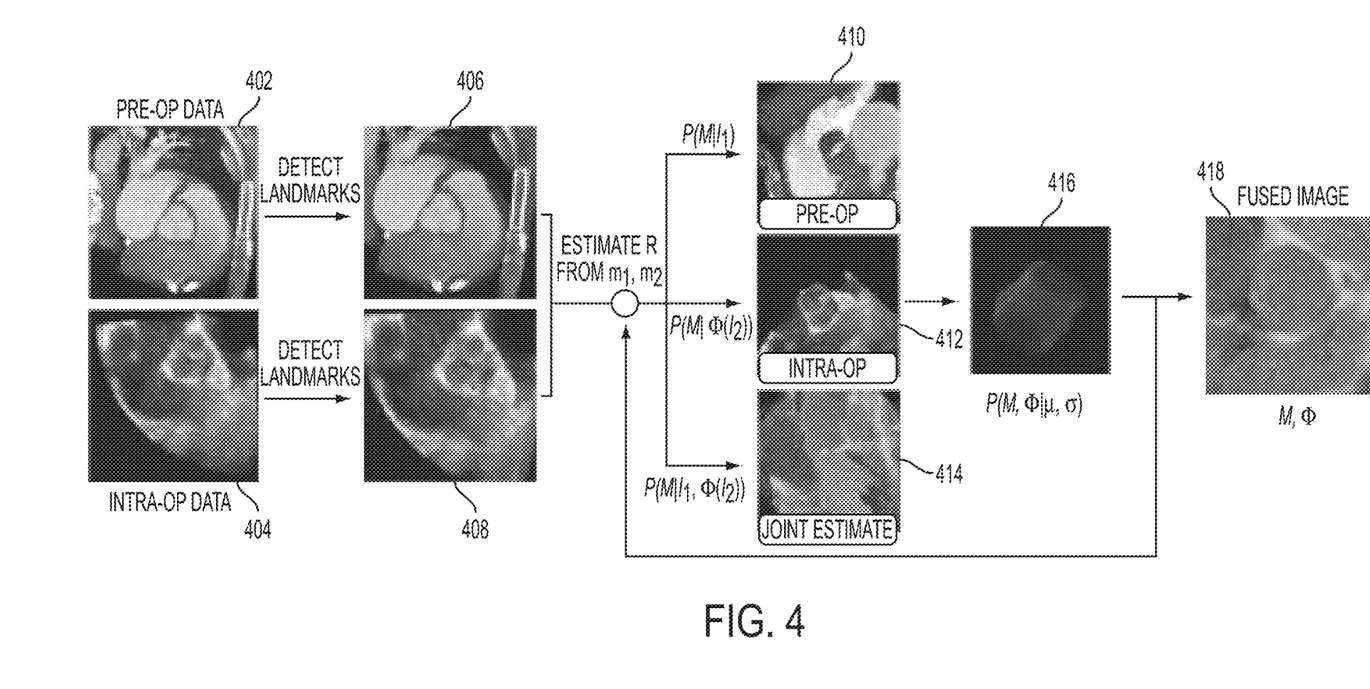
FIG. 4 illustrates the model-based fusion approach for estimation of a model and transformation using the method of FIG. 3.

FIG. 4 illustrates the model-based fusion approach for estimation of a model and transformation using the method of FIG. 3. In particular, FIG. 4 shows joint estimation of an aortic valve model and transformation in a pre-operative image 402 and post-operative image 404. Images 406 and 408 show landmarks detected in the pre-operative image 402 and the post-operative image 404, respectively.

Returning to FIG. 3, at step 304, an initial affine transformation is estimated based on the landmarks detected in the first and second images. The affine transformation A is estimated by calculating a least squares solution from the independently detected landmarks $m_1$ from the first image $I_1$ and $m_2$ from the second image $I_2$. The affine (rigid) transformation is indicated using the notation R in FIG. 4, and it is to be understood that the A and R are used interchangeable herein to indicate the affine or rigid transformation. The nonlinear warping transform D is initially set to identity, such that the transformation $\phi$ is initialized as the initial affine transformation A.

At step 306, the model of the target anatomic structure is initialized in the first image based on the detected landmarks in the first image. A correlation model between the landmarks and the point distribution model is learned from the annotated training data. The model M is initialized in the first image $I_1$ based on the detected landmarks $m_1$ using the learned correlation model. At step 308, the model is projected to the second image based on the initial affine transformation. In particular, since the nonlinear warping transform D is set to identify, the initial transformation $\phi$ is equal to the initial affine transformation A. Using the initial affine transformation A, the model M initialized in the first image $I_1$ can be back-projected to the second image $I_2$.

At step 310, the model is jointly updated in the first and second images based on the single modality probabilities and the joint probability. In the optimization phase (steps 310 and 312), an iterative approach is used. In step 310, candidates $N_1$ and $N_2$ are sampled along the surface normals of the models $M_1$ and $M_2$ in the first and second images $I_1$ and $I_2$, respectively. That is for each point in the models $M_1$ and $M_2$ a set of candidate points along a line normal to the model point is evaluated. The probability $P(M|I_1)$ is evaluated for each candidate $n_1 \in N_1$, and the probability $P(M|\phi(I_2))$ is evaluated for each candidate $n_{21} \in N_2$. In FIG. 4, the calculation of the probability $P(M|I_1)$ based on the pre-operative image and the probability $P(M|\phi(I_2))$ based on the intra-operative image is shown in images 410 and 412, respectively. The joint probability $P(M|I_1,\phi(I_2))$ is determined using a trained boosting classifier, trained as described above, to evaluate pairs of candidates from the first and second images for each point of the model. In FIG. 4, the calculation of the joint probability is shown in image 414. A cross product of the candidates $N_1 \times N_2$ is constructed and the highest probable candidate pair $(n_i,n_j)$ is selected for each model point by multiplying the single modality probabilities with the joint probability term:

$$(n_i, n_j) = \underset{n_i, n_j}{\mathrm{argmax}} \log(P(n_i \mid I_1) \cdot P(n_j \mid \phi(I_2)) \cdot P(n_i, n_j \mid I_1, \phi(I_2))). \quad (6)$$

The estimated candidate pairs are used to update the models $M_1$ and $M_2$.

At step 312, the model and transformation are regularized based on the learned statistical shape model of the target anatomic structure. In this step, the posterior probability $P(M, \phi|\mu,\Sigma)$ of M and $\phi$ is calculated based on the learned statistical shape model. In FIG. 4, the calculation of $P(M, \phi|\mu,\Sigma)$ for the aortic valve model is shown in image 416. This can be perceived as a regularization to the shape of the statistical shape model learned from the annotated training data. Thereby, the model M is updated by projecting $M_1$ to the principal component analysis (PCA) shape space using the largest 40 eigenvectors. The transformation $\phi$ is updated by calculating the rigid (affine) transformation A based on the posterior probability of the estimated candidate pairs $(n_i,n_j)$. The nonlinear warping transform D is updated by calculating a least squares solution to the warping transform $\hat{D}=\arg\min \|TM_2-D^{-1}M_1\|^2$ using radial basis functions. Thereby, the number of control points is much smaller than the number of shape points of M.

At step 314, it is determined if the model and transformation have converged. If the model and transformation have not yet converged, the method returns to step 310. Accordingly, steps 310 and 312 are iterated until the model and transformation converge. This algorithm typically converges in a small number of steps. If the model and transformation have converged at step 314, the method proceeds to step 316. At step 316, the model and transformation are output. As shown in FIG. 4, the model M is displayed in a fused image 418, which is fused by combining the pre-operative image 402 with the intra-operative image 404 using the transformation $\phi$.

Returning to FIG. 1, at step 108 a fused image is output. The fused image is generated from the first and second images using the estimated transformation. The fused image is generated by registering the second image to the first image using the transformation and combining the first image with the transformed second image. That is the fused image is generated as $I_1+\phi(I_2)$. The fused image may be output by displaying the fused image, for example on a display of a computer system. The display of the fused image may include the model of the target anatomical structure estimated jointly from the first and second images. For example, FIG. 2 shows an exemplary fused image 208 including an estimated aortic valve model M generated by fusing a pre-operative image and an intra-operative image.

Figure 5:
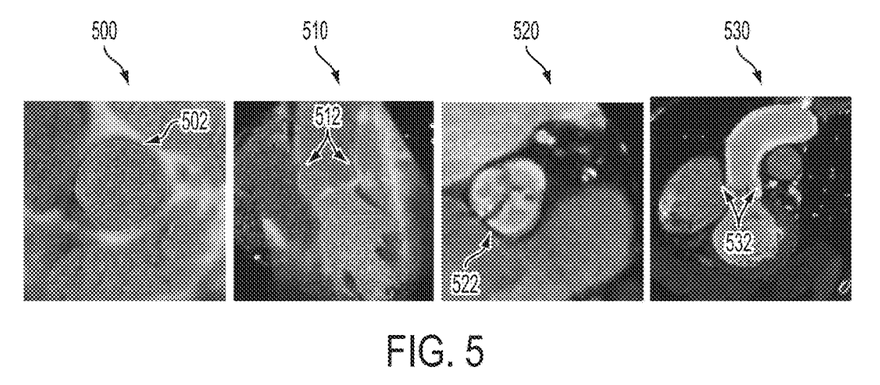
FIG. 5 illustrates exemplary mutli-modal image fusion results.

FIG. 5 illustrates exemplary mutli-modal image fusion results using the methods of FIGS. 1 and 3. As shown in FIG. 5, images 500 and 510 are fused CT-TEE images showing respective estimated aortic valve models 502 and 512. Images 520 and 530 are fused CT-3D C-arm CT images showing respective estimated aortic valve models 522 and 532.

Figure 6:
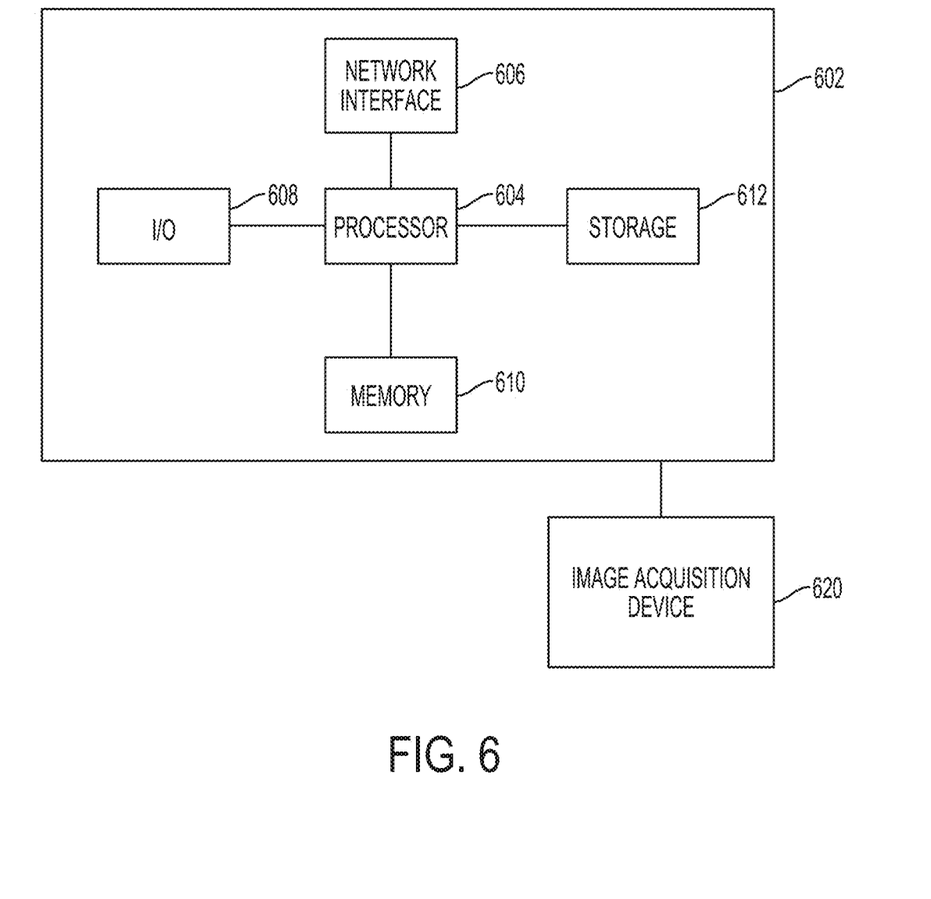
FIG. 6 is a high-level block diagram of a computer capable of implementing the present invention.

The above-described methods for model-based fusion of multi-modal images may be implemented on a computer using well-known computer processors, memory units, storage devices, computer software, and other components. A high-level block diagram of such a computer is illustrated in FIG. 6. Computer 602 contains a processor 604, which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, the steps of the methods of FIGS. 1 and 3 may be defined by the computer program instructions stored in the memory 610 and/or storage 612 and controlled by the processor 604 executing the computer program instructions. An image acquisition device 620, such as a C-arm image acquisition system, CT scanner, etc., can be connected to the computer 602 to input image data to the computer 602. It is possible to implement the image acquisition device 620 and the computer 602 as one device. It is also possible that the image acquisition device 620 and the computer 602 communicate wirelessly through a network. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.). Such input/output devices 608 may be used in conjunction with a set of computer programs as an annotation tool to annotate volumes received from the image acquisition device 620. One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for fusion of multi-modal images, comprising:
receiving a first image acquired using a first imaging modality;
receiving a second image acquired using a second imaging modality; and
jointly estimating a model of a target anatomical structure and a transformation between the first and second images from the first and second images, wherein both the model of the target anatomical structure and the transformation between the first and second images are estimated together as a function of both of the first and second images.

2. The method of claim 1, wherein the model of the target anatomical structure comprises a first model of the target anatomical structure in the first image, and the transformation comprises a transformation to project a second model of the target anatomical structure in the second image to the first model of the target anatomical structure.

3. The method of claim 2, wherein the transformation includes an affine transformation and a nonlinear warping transformation.

4. The method of claim 1, further comprising:
generating a fused image from the first and second images using the transformation.

5. The method of claim 1, wherein the step of jointly estimating a model of a target anatomical structure and a transformation between the first and second images from the first and second images comprises:
detecting landmarks independently in each of the first and second images;
estimating an initial transformation using the landmarks detected in the first and second images;
initializing the model in the first image based on the landmarks detected in the first image;
initializing a projected model in the second image using the initial transformation; and
updating the model and transformation based at least on a joint probability detected for corresponding points of the model and the projected model.

6. The method of claim 5, wherein the step of updating the model and transformation based at least on a joint probability detected for corresponding points of the model and the projected model comprises:
updating points of the model and the projected model based on respective single modality probabilities calculated for each point on the model and the projected model and the joint probability calculated for corresponding points on the model and the projected model; and
regularizing the model and transformation based on a learned statistical shape model of the target anatomic structure.

7. The method of claim 6, wherein the step of updating points of the model and the projected model based on respective single modality probabilities calculated for each point on the model and the projected model and the joint probability calculated for corresponding points on the model and the projected model comprises, for each point of the model:
sampling a plurality of candidates in the first image along a line normal to the point on the model and a plurality of candidates in the second image along a line normal to the corresponding point on the projected model;

calculating a single modality probability for each of the plurality of candidates in the first image and each of the plurality of candidates in the second image using respective trained detectors;

calculating a joint probability for each possible pair of candidates in the first and second images using a trained boosting classifier; and calculating a total probability for each possible pair of candidates in the first and second images by multiplying the single modality probability for the candidate in the first image, the single modality probability for the candidate in the second image, and the joint probability of pair of candidates; and selecting the pair of candidates in the first and second images having the highest total probability.

8. The method of claim 6, wherein the transformation includes an affine transformation and a nonlinear warping transformation, and the step of regularizing the model and transformation based on a learned statistical shape model of the target anatomic structure comprises:

calculating a posterior probability of the model and transformation based on the learned statistical shape model;

updating the model to improve the posterior probability by projecting the model to a principal component analysis (PCA) shape space of the learned statistical shape model;

updating the affine transformation and the nonlinear warping transformation based on the updated model in the first image and the projected model in the second image.

9. The method of claim 6, wherein the step of updating the model and transformation based at least on a joint probability detected for corresponding points of the model and the projected model further comprises:

repeating the steps of updating points of the model and the projected model and regularizing the model and transformation until the model and the transformation converge.

10. The method of claim 1, wherein the first image is a pre-operative image and the second image is an intra-operative image.

11. The method of claim 10, wherein the pre-operative image is a computed tomography (CT) image, and the intra-operative image is one of a C-arm CT image and a transesophageal echocardiogram (TEE) image.

12. The method of claim 1, wherein the target anatomic structure is an aortic valve.

13. An apparatus for fusion of multi-modal images, comprising:

means for receiving a first image acquired using a first imaging modality;

means for receiving a second image acquired using a second imaging modality; and means for jointly estimating a model of a target anatomical structure and a transformation between the first and second images from the first and second images, wherein both the model of the target anatomical structure and the transformation between the first and second images are estimated together as a function of both of the first and second images.

14. The apparatus of claim 13, wherein the model of the target anatomical structure comprises a first model of the target anatomical structure in the first image, and the transformation comprises a transformation to project a second model of the target anatomical structure in the second image to the first model of the target anatomical structure.

15. The apparatus of claim 14, wherein the transformation includes an affine transformation and a nonlinear warping transformation.

16. The apparatus of claim 13, further comprising:

means for generating a fused image from the first and second images using the transformation.

17. The apparatus of claim 13, wherein the means for jointly estimating a model of a target anatomical structure and a transformation between the first and second images from the first and second images comprises:

means for detecting landmarks independently in each of the first and second images;

means for estimating an initial transformation using the landmarks detected in the first and second images;

means for initializing the model in the first image based on the landmarks detected in the first image;

means for initializing a projected model in the second image using the initial transformation; and means for updating the model and transformation based at least on a joint probability detected for corresponding points of the model and the projected model.

18. The apparatus of claim 17, wherein the means for updating the model and transformation based at least on a joint probability detected for corresponding points of the model and the projected model comprises:

means for updating points of the model and the projected model based on respective single modality probabilities calculated for each point on the model and the projected model and the joint probability calculated for corresponding points on the model and the projected model; and means for regularizing the model and transformation based on a learned statistical shape model of the target anatomic structure.

19. The apparatus of claim 18, wherein the means for updating points of the model and the projected model based on respective single modality probabilities calculated for each point on the model and the projected model and the joint probability calculated for corresponding points on the model and the projected model comprises, for each point of the model:

means for sampling a plurality of candidates in the first image along a line normal to the point on the model and a plurality of candidates in the second image along a line normal to the corresponding point on the projected model;

means for calculating a single modality probability for each of the plurality of candidates in the first image and each of the plurality of candidates in the second image using respective trained detectors;

means for calculating a joint probability for each possible pair of candidates in the first and second images using a trained boosting classifier; and means for calculating a total probability for each possible pair of candidates in the first and second images by multiplying the single modality probability for the candidate in the first image, the single modality probability for the candidate in the second image, and the joint probability of pair of candidates; and means for selecting the pair of candidates in the first and second images having the highest total probability.

20. The apparatus of claim 18, wherein the transformation includes an affine transformation and a nonlinear warping transformation, and the means for regularizing the model and transformation based on a learned statistical shape model of the target anatomic structure comprises:
  means for calculating a posterior probability of the model and transformation based on the learned statistical shape model;
  means for updating the model to improve the posterior probability by projecting the model to a principal component analysis (PCA) shape space of the learned statistical shape model;
  updating the affine transformation and the nonlinear warping transformation based on the updated model in the first image and the projected model in the second image.

21. A non-transitory computer readable medium encoded with computer executable instructions for fusion of multi-modal images, the computer executable instructions defining a method comprising:
  receiving a first image acquired using a first imaging modality;
  receiving a second image acquired using a second imaging modality; and
  jointly estimating a model of a target anatomical structure and a transformation between the first and second images from the first and second images, wherein both the model of the target anatomical structure and the transformation between the first and second images are estimated together as a function of both of the first and second images.

22. The non-transitory computer readable medium of claim 21, wherein the model of the target anatomical structure comprises a first model of the target anatomical structure in the first image, and the transformation comprises a transformation to project a second model of the target anatomical structure in the second image to the first model of the target anatomical structure.

23. The non-transitory computer readable medium of claim 22, wherein the transformation includes an affine transformation and a nonlinear warping transformation.

24. The non-transitory computer readable medium of claim 21, wherein the method further comprises:
  generating a fused image from the first and second images using the transformation.

25. The non-transitory computer readable medium of claim 21, wherein the step of jointly estimating a model of a target anatomical structure and a transformation between the first and second images from the first and second images comprises:
  detecting landmarks independently in each of the first and second images;
  estimating an initial transformation using the landmarks detected in the first and second images;
  initializing the model in the first image based on the landmarks detected in the first image;
  initializing a projected model in the second image using the initial transformation; and
  updating the model and transformation based at least on a joint probability detected for corresponding points of the model and the projected model.

26. The non-transitory computer readable medium of claim 25, wherein the step of updating the model and transformation based at least on a joint probability detected for corresponding points of the model and the projected model comprises:
  updating points of the model and the projected model based on respective single modality probabilities calculated for each point on the model and the projected model and the joint probability calculated for corresponding points on the model and the projected model; and
  regularizing the model and transformation based on a learned statistical shape model of the target anatomic structure.

27. The non-transitory computer readable medium of claim 26, wherein the step of updating points of the model and the projected model based on respective single modality probabilities calculated for each point on the model and the projected model and the joint probability calculated for corresponding points on the model and the projected model comprises, for each point of the model:
  sampling a plurality of candidates in the first image along a line normal to the point on the model and a plurality of candidates in the second image along a line normal to the corresponding point on the projected model;
  calculating a single modality probability for each of the plurality of candidates in the first image and each of the plurality of candidates in the second image using respective trained detectors;
  calculating a joint probability for each possible pair of candidates in the first and second images using a trained boosting classifier; and
  calculating a total probability for each possible pair of candidates in the first and second images by multiplying the single modality probability for the candidate in the first image, the single modality probability for the candidate in the second image, and the joint probability of pair of candidates; and
  selecting the pair of candidates in the first and second images having the highest total probability.

28. The non-transitory computer readable medium of claim 26, wherein the transformation includes an affine transformation and a nonlinear warping transformation, and the step of regularizing the model and transformation based on a learned statistical shape model of the target anatomic structure comprises:
  calculating a posterior probability of the model and transformation based on the learned statistical shape model;
  updating the model to improve the posterior probability by projecting the model to a principal component analysis (PCA) shape space of the learned statistical shape model;
  updating the affine transformation and the nonlinear warping transformation based on the updated model in the first image and the projected model in the second image.

29. The non-transitory computer readable medium of claim 26, wherein the step of updating the model and transformation based at least on a joint probability detected for corresponding points of the model and the projected model further comprises:
  repeating the steps of updating points of the model and the projected model and regularizing the model and transformation until the model and the transformation converge.

30. The non-transitory computer readable medium of claim 21, wherein the first image is a pre-operative image and the second image is an intra-operative image.

31. The non-transitory computer readable medium of claim 30, wherein the pre-operative image is a computed tomography (CT) image, and the intra-operative image is one of a C-arm CT image and a transesophageal echocardiogram (TEE) image.

32. The non-transitory computer readable medium of claim 21, wherein the target anatomic structure is an aortic valve.

* * * * *